US011984068B2

(12) United States Patent
Lee

(10) Patent No.: US 11,984,068 B2
(45) Date of Patent: May 14, 2024

(54) DISPLAY DEVICE FOR COMPENSATING DETERIORATION AND METHOD OF COMPENSATING THEREOF

(71) Applicant: LG Display Co., Ltd., Seoul (KR)

(72) Inventor: Won-Hee Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/556,764

(22) Filed: Dec. 20, 2021

(65) Prior Publication Data

US 2022/0208090 A1 Jun. 30, 2022

(30) Foreign Application Priority Data

Dec. 28, 2020 (KR) ........................ 10-2020-0184997

(51) Int. Cl.
*G09G 3/3208* (2016.01)

(52) U.S. Cl.
CPC ....... *G09G 3/3208* (2013.01); *G09G 2310/08* (2013.01); *G09G 2320/043* (2013.01); *G09G 2360/145* (2013.01)

(58) Field of Classification Search
CPC ....... G09G 2320/043; G09G 2320/045; G09G 2320/0285
See application file for complete search history.

(56) References Cited

U.S. PATENT DOCUMENTS 6,414,661 B1 * 7/2002 Shen .................... G09G 3/3208 345/82
10,176,736 B2 * 1/2019 Chaji ....................... G09G 3/32
2012/0154460 A1 * 6/2012 Segawa ............... H01L 27/3276 345/77
2013/0027383 A1 * 1/2013 Odawara ............. G09G 3/3233 345/212
2013/0083001 A1 * 4/2013 Jeong .................. G09G 3/3266 345/82
2014/0160142 A1 * 6/2014 Lee ...................... G09G 3/3208 345/589
2014/0320553 A1 * 10/2014 Eom .................... G09G 3/3208 345/77
2016/0104411 A1 * 4/2016 Nathan ................ G09G 3/3283 345/77
2017/0345377 A1 * 11/2017 Oh ........................ G09G 3/3291
2018/0108721 A1 * 4/2018 Lee ....................... G09G 3/3233
2018/0366060 A1 * 12/2018 Chaji ................... G09G 3/3291
(Continued)

FOREIGN PATENT DOCUMENTS

KR 10-2013-0043039 A 4/2013
KR 10-2018-0061792 A 6/2018
(Continued)

*Primary Examiner* — William Boddie
*Assistant Examiner* — Bipin Gyawali
(74) *Attorney, Agent, or Firm* — Birch, Stewart, Kolasch & Birch, LLP

(57) ABSTRACT

A display device according to an example can include a display panel including a plurality of sub pixels to display an image, a memory configured to store a look-up table including a gain value, and a deterioration compensating unit configured to compensate the deterioration of the deteriorated sub pixel based on a sensing voltage input from the display panel and update the look-up table by measuring a luminance of the image displayed on the display panel.

18 Claims, 7 Drawing Sheets

(56) References Cited

U.S. PATENT DOCUMENTS

| | | | | |
|---|---|---|---|---|
| 2019/0066555 | A1* | 2/2019 | Gu | G09G 3/006 |
| 2021/0065606 | A1* | 3/2021 | Park | G09G 3/20 |

FOREIGN PATENT DOCUMENTS

| | | | |
|---|---|---|---|
| KR | 10-2018-0067884 | A | 6/2018 |
| KR | 10-2019-0034854 | A | 4/2019 |
| KR | 10-2019-0076259 | A | 7/2019 |
| KR | 10-2020-0017991 | A | 2/2020 |

* cited by examiner

DISPLAY DEVICE FOR COMPENSATING DETERIORATION AND METHOD OF COMPENSATING THEREOF

CROSS-REFERENCE TO RELATED APPLICATIONS

This application claims priority to Korean Patent Application No. 10-2020-0184997, filed in the Republic of Korea on Dec. 28, 2020, the contents of which are hereby expressly incorporated by reference in its entirety into the present application.

BACKGROUND OF THE DISCLOSURE

Field of the Disclosure

This present disclosure relates to a display device and a method of compensating deterioration associated with the display device.

Discussion of the Background Art

As multimedia develops, the need for flat panel displays is increasing. As a result, a flat panel display device such as a liquid crystal display device, a plasma display device, and an organic light emitting display device has been commercialized. Among these flat panel display devices, the organic light emitting display device is currently widely used because of a high response speed, high luminance and good viewing angle.

However, the luminance characteristics of the organic light emitting display panel may be deteriorated due to the deterioration of the organic light emitting device after a certain period of time. Since the driving time increases, the deterioration rate of the organic light emitting diode may be increased, and the luminance characteristic may be deteriorated quickly.

SUMMARY OF THE DISCLOSURE

An object of this disclosure is to provide a display device capable of compensating for deterioration and a method of compensating for deterioration thereof.

Another object of this disclosure is to provide a display device capable of improving the efficiency of image compensation by measuring the luminance of an actual image and updating a lookup table, and a method for compensating for the same.

In order to achieve these objects and other features, the display device according to an example of this disclosure can comprise a display panel including a plurality of sub pixels to display an image, a memory configured to store a look-up table including a gain value, and a deterioration compensating unit configured to compensate the deterioration of the deteriorated sub pixel based on a sensing voltage input from the display panel and update the look-up table by measuring a luminance of the image displayed on the display panel.

The deterioration compensating unit can include a look-up table updating unit configured to write a new look-up table by measuring the luminance of the image displayed in the display panel to update the look-up table stored in the memory, a gain value reading unit configured to read a gain value of the look-up table stored in the memory, and a data modulating unit configured to modulate data input to the display panel based on the gain value from the gain value reading unit.

The look-up table updating unit can include a luminance measuring unit configured to measure the luminance of the image displayed on the display panel, a gain value calculating unit configured to calculate the gain value based on the luminance measured in the luminance measuring unit, and a look-up table writing unit configured to write the new look-up table based on the gain value calculated in the gain value calculating unit.

The luminance of the image displayed on the display panel can be measured by a camera and the camera can be a charged coupled device camera.

The luminance measuring unit can measure the luminance of deterioration region and reference luminance measuring region of the display panel, the reference luminance measuring region can be a peripheral region of the deteriorated region, and the distance between the reference luminance measuring region and the deterioration region can equal to a sum of the widths of 15 to 20 sub pixels.

The gain value calculating unit can calculate the gain value based on the luminance of the deteriorated region of the display pane and the reference luminance of the reference luminance measuring region. At this time, the reference luminance of the reference luminance measuring region can be an average value of the luminance of a plurality of positions of the reference luminance measuring region.

The look-up table writing unit can write the new look-up table by calculating the gain values of a plurality of deterioration regions.

The method of compensating deterioration of a display device according to an example of this disclosure can comprise measuring a luminance of an image displayed on a display panel, calculating a gain value based on the measured luminance, writing a look-up table based on the calculated gain value and updating a previous look-up table with the written look-up table, modulating data according to the updated look-up table, and applying the modulated data to the display panel.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Figure 1:
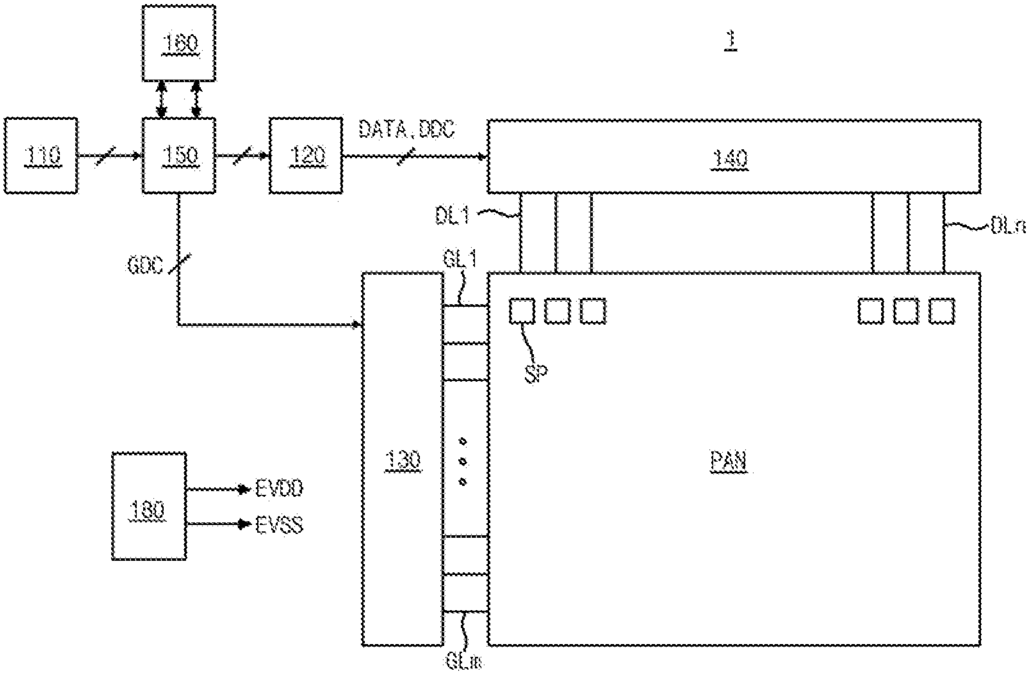
FIG. 1 is a schematic block diagram according to an embodiment of this disclosure.

Advantages and features of the present disclosure and methods for achieving them will be made clear from embodiments described in detail below with reference to the accompanying drawings. The present disclosure can, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined only by the scope of the appended claims.

Shapes, sizes, ratios, angles, numbers, and the like disclosed in the drawings for describing the embodiments of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When terms such as “including,” “having,” “comprising,” and the like mentioned in this disclosure are used, other parts can be added unless the term “only” is used herein. When a component is expressed as being singular, being plural is included unless otherwise specified.

In analyzing a component, an error range is interpreted as being included even when there is no explicit description.

In describing a positional relationship, for example, when a positional relationship of two parts is described as being “on,” “above,” “below,” “next to,” or the like, unless “immediately” or “directly” is used, one or more other parts can be located between the two parts.

In describing a temporal relationship, for example, when a temporal predecessor relationship is described as being “after,” “subsequent,” “next to,” “prior to,” or the like, unless “immediately” or “directly” is used, cases that are not continuous can also be included.

Although the terms “first”, “second”, and the like are used to describe various components, these components are not substantially limited by these terms. These terms are used only to distinguish one component from another component. Therefore, a first component described below can substantially be a second component within the technical spirit of the present disclosure.

In describing components of the specification, the terms “first”, “second”, “A”, “B”, “(a)”, “(b)”, and the like can be used. These terms are intended to distinguish one component from other components, but the nature, sequence, order, or number of the components is not limited by those terms. When components are disclosed as being “connected,” “coupled,” or “in contact” with other components, the components can be directly connected or in contact with the other components, but it should be understood that another component(s) could be “interposed” between the components and the other components or could be “connected,” “coupled,” or “contacted” therebetween.

In the specification, a “display device” can include display devices in a narrow sense, such as liquid crystal modules (LCMs), OLED modules, and quantum dot (QD) modules, and the like which include display panels and drivers for driving the display panels. In addition, the display device can also include laptop computers, televisions, and computer monitors which are complete products or final products including LCMs, OLED modules, QD modules, or the like, equipment displays including automotive displays or other types of vehicles, and set electronic devices, set devices, or set apparatuses such as mobile electronic devices such as smartphones or electronic pads.

Thus, the display device in the specification can include display devices in a narrow sense, such as LCMs, OLED modules, QD modules, or the like, and application products or set devices which are end consumer devices, which include the LCMs, the OLED modules, the QD modules, or the like.

In addition, in some cases, it can be separately expressed that LCMs, OLED modules, and QD modules, which include display panels and drivers, are expressed as “display devices” in some cases, and electronic devices as complete products including the LCMs, the OLED modules, or QD modules are expressed as “set devices.” For example, the display device in a narrow sense can be a concept including a display panel such as a liquid crystal display (LCD) panel, an OLED panel, or a QD display panel, and a source printed circuit board (PCB) which is a controller for driving the display panel, and the set device can be a concept further including a set PCB which is a set controller which is electrically connected to the source PCB to control an entirety of the set device.

The display panel used in the present embodiments can employ all types of display panels such as a liquid crystal display panel, an OLED panel, a QD display panel, an electroluminescent display panel, and the like. However, the present disclosure is not limited to a specific display panel of which a bezel can be bent with a flexible substrate for an OLED panel of the present embodiments and a backplane support structure below the flexible substrate. In addition, the display panel used in the display device according to the various embodiments of the present disclosure is not limited to a shape or size of the display panel.

For example, when the display panel is an OLED panel, the display panel can include a plurality of gate lines, a plurality of data lines, and a plurality of pixels formed in intersection regions between the gate lines and the data lines. In addition, each of the pixels can include an array including a thin film transistor (TFT) which is an element for selectively applying a voltage to each pixel, an OLED layer on the array, and an encapsulation substrate or an encapsulation layer, which is disposed on the array to cover the OLED layer. The encapsulation layer can protect the TFT and the OLED layer from an external impact and prevent moisture or oxygen from infiltrating into the OLED layer. In addition, a layer formed on the array can include an inorganic light emitting layer, e.g., a nano-sized material layer or a quantum dot.

Hereinafter, the embodiments of the present disclosure will be described in detail with reference to accompanying drawings. All components of each display device according to all embodiments of the present invention are operatively coupled and configured.

Figure 2:
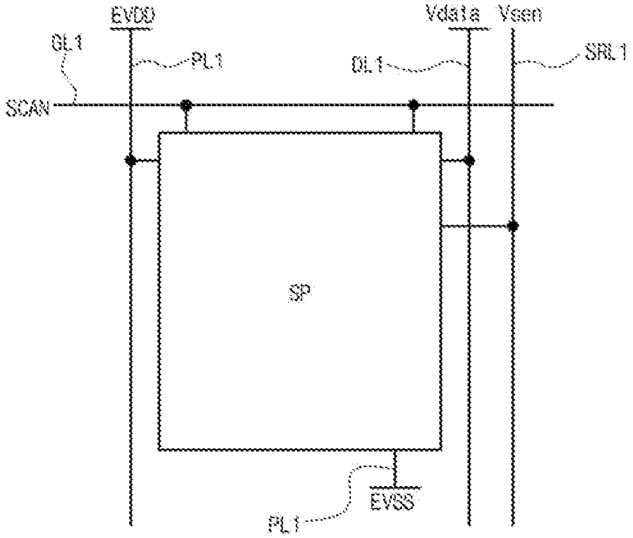
FIG. 2 is a schematic block diagram of a sub pixel of an organic light emitting display device according to an embodiment of this disclosure.

FIG. 1 is the schematic block diagram according to this disclosure and FIG. 2 is the schematic block diagram of the sub pixel of an organic light emitting display device according to an embodiment of this disclosure.

As shown in FIG. 1, an organic light emitting display device 1 includes an image processing unit 110, a deterioration compensating unit 150, a memory 160, a timing controlling unit 120, a gate driving unit 130, a data driving unit 140, a power supplying unit 180, and a display panel PAN including a plurality of sub pixels SP.

The image processing unit 110 outputs an image data supplied from outside and a driving signal for driving various devices. For example, the driving signal from the image processing unit 110 can include a data enable signal, a vertical synchronizing signal, a horizontal synchronizing signal, and a clock signal.

A sensing voltage Vsen is supplied to the deterioration compensating unit 150 from the data driving unit 140. The deterioration compensating unit 150 modulates the input image data Idata of each sub pixel SP at present frame based on gain value of a look-up table stored in the memory 160 and then supplies the modulated image data Mdata to the timing controlling unit 120. Further, the deterioration compensating unit 150 writes the look-up table LUT and supplies the written look-up table LUT to the memory 160 to update the look-up table of the memory 160.

The modulated image data Mdata modulated by the deterioration compensating unit 150 and the driving signal are supplied to the timing controlling unit 120. The timing controlling unit 120 writes and outputs gate timing controlling signal GDC for controlling the driving timing of the gate driving unit 130 and data timing controlling signal DDC for controlling the driving timing of the data driving unit 140 based on the driving signal from the image processing unit 110.

The timing controlling unit 120 controls the driving timing of the gate driving unit 130 and the data driving unit 140 to obtain at least one sensing voltage Vsen from each sub pixel SP and supply to the obtained sensing voltage Vsen to the deterioration compensating unit 150.

The gate driving unit 130 outputs the scan signal to the display panel PAN in response to the gate timing control signal GDC supplied from the timing controlling unit 120. The gate driving unit 130 outputs the scan signal through a plurality of gate lines GL1 to GLm, where m can be a positive number such as a positive integer. In this case, the gate driving unit 130 can be formed in the form of an integrated circuit (IC) and can be formed in the display panel by depositing directly various patterns and layer, but is not limited thereto.

The data driving unit 140 outputs the data voltage to the display panel PAN in response to the data timing control signal DDC input from the timing controlling unit 120. The data driving unit 140 samples and latches the digital data signal DATA supplied from the timing controlling unit 120 to convert it into the analog data voltage based on the gamma voltage. The data driving unit 140 outputs the data voltage through the plurality of data lines DL1 to DLn, where n can be a positive number such as a positive integer.

Further, the data driving unit 140 supplies the sensing voltage Vsen input from the display panel PAN to the deterioration compensating unit 150 through a sensing voltage readout line.

In this case, the data driving unit 140 can be mounted on the top surface of the display panel PAN in the form of an integrated circuit (IC) or can be formed by stacking various patterns and layers directly on the display panel PAN, but is not limited thereto.

The power supplying unit 180 outputs high potential driving voltage EVDD and lower potential driving voltage EVSS etc. to supply these to the display panel PAN. The high potential driving voltage EVDD and the lower potential driving voltage EVSS is supplied to the display panel PAN through the power line. In this time, the voltage from the power supplying unit 180 are applied to the data driving unit 140 or the gate driving unit 130 to drive thereto.

The display panel PAN displays the image based on the data voltage and the scan signal from the data driving unit 140 and the gage driving unit 130 and the power from the power supplying unit 180.

The display panel includes a plurality of sub pixels SP to display the image. The sub pixel SP can include Red sub pixel, Green sub pixel, and Blue sub pixel. Further, the sub pixel SP can include White sub pixel, the Red sub pixel, the Green sub pixel, and the Blue sub pixel. The White sub pixel, the Red sub pixel, the Green sub pixel, and the Blue sub pixel can be formed in the same area or can be formed in different areas.

The look-up table of the deterioration compensating gain value is stored in the memory 160. Further, the update timing of the look-up table is also stored in the memory and this update timing is notified to the user through the display panel. For example, the update timing can be determined by the driving number or driving time. For example, the look-up table LUT can be repeatedly updated whenever the set number of driving number and driving time have elapsed.

The update cycle of the look-up table LUT can be always the same or can be changed. The deterioration of the organic light emitting layer of the organic light emitting device can be accelerated as the driving number or driving time elapses. Accordingly, as the driving number or driving time elapses, the look-up table LUT can be updated with a shorter cycle instead of same cycle.

Further, the look-up table LUT can be update periodically. For example, in case where the organic light emitting display device 100 is installed in the vehicles such as automobile, the update cycle of the look-up table LUT is when user visits a car repair shop to check or repair his car. Further, in case where the organic light emitting display device 100 is adapted to electronic mobile apparatus such as a smart phone or tablet PC, the update cycle of the look-up table LUT is when user visits a mobile device dealer or repair shop.

The look-up table LUT stored in the memory 160 is formed in various types. For example, the look-up table LUT can be formed in table type of the gain value corresponding to the sensing voltage Vsen and can be stored in the form of a first order function or a form of a second order function of the sensing voltage Vsen and the gain value.

As shown in FIG. 2, one sub pixel SP can be connected to the gate line GL1, the data line DL1, the sensing voltage readout line SRL1, and the power line PL1. The number of transistors and capacitors and the driving method of the (or each) subpixel SP are determined according to the circuit configuration.

Figure 3:
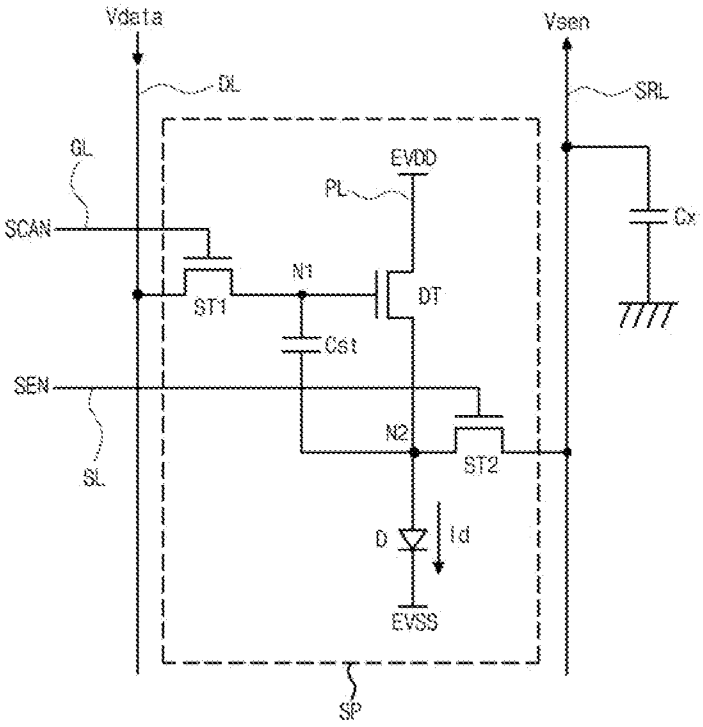
FIG. 3 is a circuit diagram of the sub pixel of the organic light emitting display device according to the embodiment of this disclosure.

FIG. 3 is the circuit diagram illustrating each sub pixel SP of the organic light emitting display device 1 according to an example of this disclosure.

As shown in FIG. 3, the organic light emitting display device 1 according to this invention includes the gate line GL and the data line DL, the power line PL, and the sensing line SL crossing each other for defining the subpixel SP. A driving TFT DT, an organic light emitting device D, a storage capacitor Cst, a first switch TFT ST1, and a second switch TFT ST2 are disposed in the sub pixel SP.

The organic light emitting device D includes an anode electrode connected to a second node N2, a cathode electrode connected to an input terminal of the low potential driving voltage EVSS, and an organic light emitting layer disposed between the anode electrode and the cathode electrode.

The driving TFT DT controls the current Id flowing through the organic light emitting device D according to the gate-source voltage Vgs. The driving TFT DT includes a gate electrode connected to a first node N1, a drain electrode connected to the power line PL to provide the high potential driving voltage EVDD, and a source electrode connected to the second node N2.

The storage capacitor Cst is connected between the first node N1 and the second node N2.

When the display panel PAN is working, the first switch TFT ST1 applies the data voltage Vdata charged in the data line DL to the first node N1 in response to the gate signal (or scan signal) SCAN to turn on the driving TFT DT. In this case, the first switch TFT ST1 includes a gate electrode connected to the gate line GL to receive a scan signal SCAN, a drain electrode connected to the data line DL to receive a data voltage Vdata, and a source electrode connected to first node N1.

The second switch TFT ST2 switches the current between the second node N2 and the sensing voltage readout line SRL in response to the sensing signal SEN to store the source voltage of the second node N2 in a sensing capacitor Cx of the sensing voltage readout line SRL. The second switch TFT ST2 switches the current between the second node N2 and the sensing voltage readout line SRL in response to the sensing signal SEN when the display panel PAN is working to reset the source voltage of the driving TFT DT into the initial voltage Vpre. In this case, the gate electrode of the second switch TFT ST2 is connected to the sensing line SL, the drain electrode is connected to the second node N2, and the source electrode is connected to the sensing voltage readout line SRL.

In the organic light emitting display device 1 having such a structure, the organic light emitting layer deteriorates as the driving time increases, the luminance is decreased, and unrecoverable afterimage occurs as the using time of the organic light emitting device increases due to this deterioration. In order to solve the luminance degradation and the afterimage, it is necessary to increase the luminance to target luminance by compensating for deterioration of the organic light emitting layer.

According to an example of the present disclosure, the gain value of the sensing voltage Vsen inputted from the display panel PAN is stored as the look-up table LUT to compensate the deterioration. According to an example of the present disclosure, specially, the deterioration is compensated by updating the look-up table LUT at a set timing or a necessary timing. The reason is as follows.

The look-up table LUT is manufactured by measuring the luminance and the initial sensing voltage Vsen of the display panel PAN of the organic light emitting display device 1 before shipment. For example, before shipment of the product, the sensing voltage Vsen according to the luminance decrease due to deterioration occurring in the display panel PAN is measured, and the sensing voltage Vsen is manufactured as a look-up table LUT and stored in the memory 160.

The look-up table LUT is used to compensate for deterioration when a user actually uses the organic light emitting display device 1 after product shipment. For example, the sensing voltage Vsen is continuously measured while the organic light emitting display device 1 is in use. The deterioration compensating unit 150 reads the gain value corresponding to the measured sensing voltage Vsen from the lookup table LUT and then modulates the image data by the read gain value to supply the modulated image data to the display panel PAN.

Therefore, the increased current is supplied to the sub pixel or the region (the region composed of a plurality of sub pixels, hereinafter the sub pixel or the region in which the deterioration does not occur is referred as a region) of which the luminance may be decreased by the deterioration to equalize almost the decreased luminance of this region to the luminance of non-deteriorated region.

However, the relationship between the sensing voltage Vsen and the gain value of the look-up table LUT manufactured before shipment of the product and the relationship between the sensing voltage Vsen and the gain value when the organic light emitting display device 1 is actually used are different from each other. This difference may cause degradation in the deterioration compensating efficiency when the organic light emitting display device 1 is actually used, so that accurate compensation may be at risk and thus the image quality of the organic light emitting display device 1 may be deteriorated.

There can be various reasons for the difference between the gain value of the look-up table LUT manufactured before shipment and the gain value of the product actually used. For example, an environment in which the look-up table LUT is manufactured before product shipment and an environment in which the organic light emitting display device 1 is actually used can be different. For example, when the organic light emitting display device 1 is applied to the vehicle, the vehicle can be used in harsh environments such as high and low temperatures.

Accordingly, there is a large difference between the manufacturing environment of the look-up table LUT performed in the factory and the environment in which the organic light emitting display device 1 is actually used. Due to this difference, it can be difficult to accurately compensate for deterioration of the organic light emitting display device 1 used in the harsh environment with the look-up table LUT manufactured in the factory.

In addition, since the deterioration can be accumulated as the organic light emitting display device 1 is used for a long time, the difference can occur between the gain value of the look-up table LUT manufactured before product shipment and the gain value of the look-up table LUT of the organic light emitting display device 1 in which deterioration is accumulated. The increased current is supplied to the deterioration compensated region, and the deterioration of this region is accelerated by the increase of the current, so that it can be difficult to accurately compensate for deterioration of the organic light emitting display device in which deterioration has been accumulated for a long time.

In the embodiments of this disclosure, since the look-up table LUT is rewritten at a set timing or as needed to update the look-up table LUT stored in the memory, it is possible to prevent inaccurate deterioration compensation caused by the difference in use environment or accumulation of deterioration over long time. Hereinafter, this will be described in detail with reference to the accompanying drawings.

Figure 4:
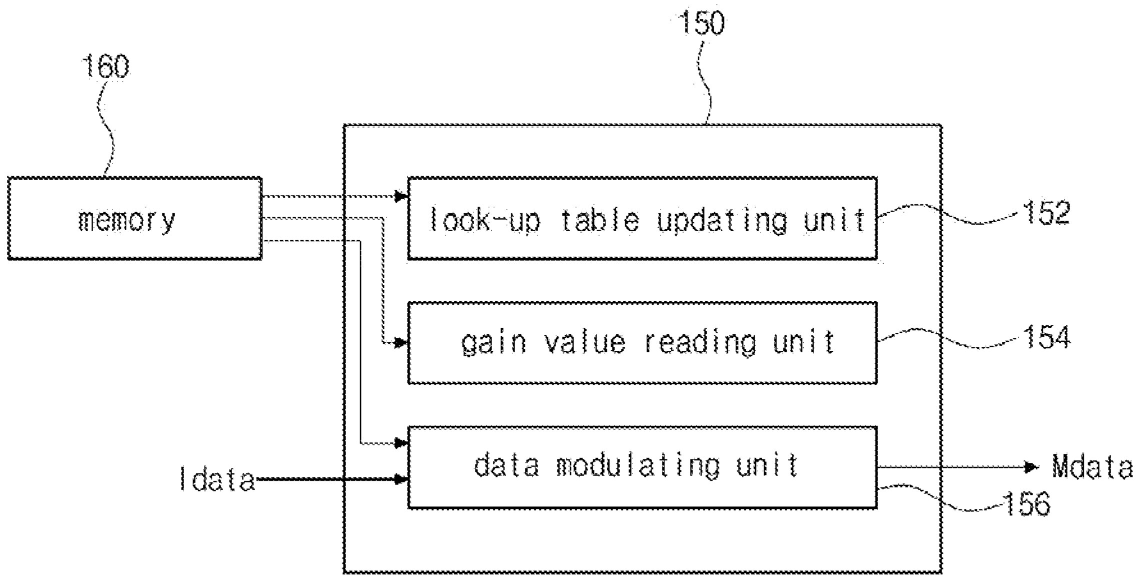
FIG. 4 is a block diagram illustrating a specific structure of a deterioration compensating unit of the organic light emitting display device according to the embodiment of this disclosure.

FIG. 4 is the block diagram showing the structure of the deterioration compensating unit 150 according to an embodiment of this disclosure.

As shown in FIG. 4, the deterioration compensating unit 150 includes a look-up table updating unit 152, a gain value reading unit 154, and a data modulating unit 156.

The look-up table updating unit 152 updates the look-up table LUT stored in the memory 160 by writing the look-up table LUT at a set update time or as need. The look-up table updating unit 152 captures directly the images in the deteriorated region and non-deteriorated region of the display panel PAN to measure directly the luminance in these regions and then calculates the gain value from the luminance difference between these regions. The look-up table updating unit 152 updates the look-up table LUT by newly writing the lookup table LUT based on the calculated gain value and storing the look-up table LUT in the memory 160.

Since a luminance measuring camera should be provided to measure the luminance of the display panel PAN, the look-up table LUT should be updated at specific place. For example, in case where the organic light emitting display device 1 is installed in the automobile, the look-up table is updated in the car repair shop or car dealer shop having the luminance measuring camera. Further, in case where the organic light emitting display device 1 is adapted to electronic mobile apparatus such as a smart phone or tablet PC, the look-up table is updated in the repair shop or the dealer shop having the luminance measuring camera. However, the look-up table LUT can be updated in various places without being limited to these places.

The sensing voltage Vsen of the display panel PAN is inputted to the gain value reading unit 154 from the data driving unit 140 and the gain value corresponding to the sensing voltage Vsen is read from the look-up table LUT stored in the memory 160 to supply the read gain value to the data modulating unit 154.

The input image data Idata of each sub pixel at present frame is modulated by the data modulating unit 156 based on the gain value provided from the gain value reading unit 154 and then the modulated image data Mdata is supplied to the timing controlling unit 120.

The look-up table LUT including the gain value is stored in the memory 160.

The look-up table LUT according to this invention can be in the form of a first order function or a form of a second order function with respect to the sensing voltage Vsen and the gain value G. Further, the look-up table LUT can be the table in which the sensing voltage Vsen and the gain value G correspond.

The update timing of the look-up table LUT can be stored in the memory 160. The memory 160 provides an update timing of the look-up table LUT according to the request of the deterioration compensating unit 150 and the deterioration compensating unit 150 can display the update timing of the look-up table LUT on the display panel PAN by the timing controlling unit 120 to notify the update timing to the user.

Figure 5:
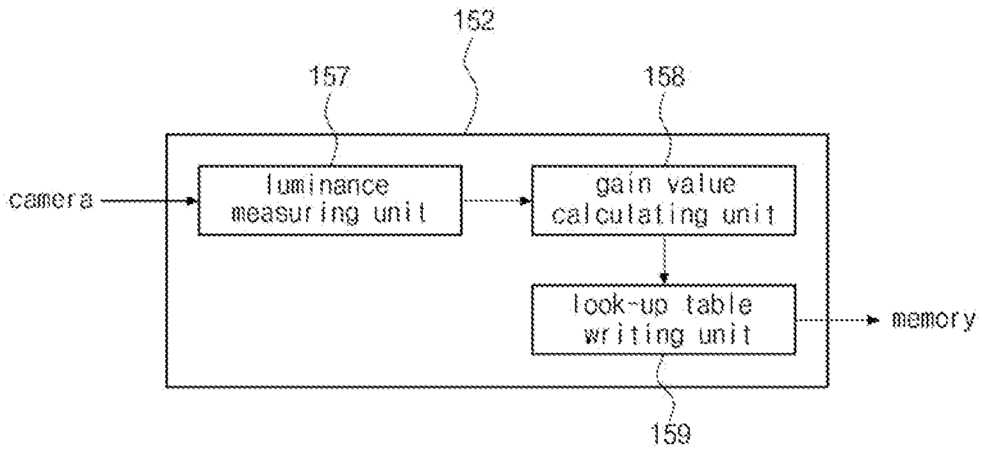
FIG. 5 is a block diagram illustrating the structure of a look-up table updating unit of the organic light emitting display device according to the embodiment of this disclosure.

FIG. 5 is a block diagram showing the look-up table updating unit 152 of FIG. 4.

As shown in FIG. 5, the look-up table updating unit 152 includes a luminance measuring unit 157, a gain value calculating unit 158, and a look-up table writing unit 159.

The luminance measuring unit 157 measures the luminance of the area photographed from the image of the display panel PAN input from the camera. At this time, the camera not only takes a picture of the deteriorated area but also the non-deteriorated area, and the luminance measuring unit 157 measures the luminance of the deteriorated area and the non-deteriorated area.

The position of the deteriorated region of the display panel PAN can be detected by measuring the sensing voltage Vsen of the corresponding region. The deterioration compensation unit 150 detects the positions of the deteriorated region and non-deteriorated region by the sensing voltage Vsen, and provides them to the camera. The camera takes a picture of the deteriorated region and the non-deteriorated region based on the provided information. In this case, the camera can take a picture of a plurality of sub-pixels and regions.

The luminance measurement in the luminance measuring unit 157 is input to the gain value calculating unit 158 to calculate the gain value. At this time, the gain value calculating unit 158 compares the luminance of the deteriorated region with the luminance of the non-deteriorated region to calculate the gain value.

The look-up table writing unit 159 writes the look-up table LUT by the calculated gain value and then supplies the written look-up table LUT to the memory to update the look-up table LUT stored in the memory 160.

The look-up table writing unit 159 writes the relationship between the sensing voltage Vsen and the gain value as the table based on the gain values of a plurality of positions to supply it to the memory 160, or writes the relationship between the sensing voltage Vsen and the gain value as the function to supply it to the memory 160.

Figure 6:
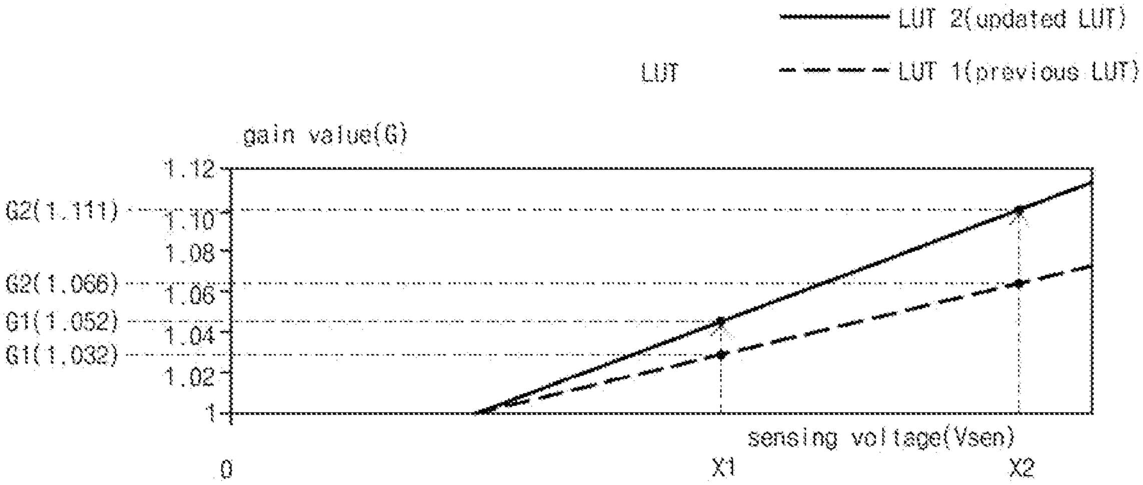
FIG. 6 is the view showing a look-up table before update and an updated look-up table according to an example of this disclosure.

FIG. 6 is the view showing a look-up table LUT stored in the organic light emitting display device 1 according to an example of this disclosure, and previous (before updated) look-up table LUT1 and updated look-up table LUT2 are shown. In this case, the look-up tables LUT1 and LUT2 are functions representing the relationship between the sensing voltage Vsen and the gain value sensed by the display panel PAN, respectively.

Figure 7A:
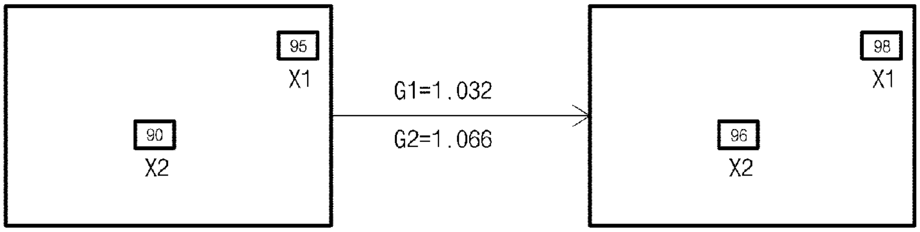
FIGS. 7A and 7B are views conceptually illustrating luminance compensation by the look-up table before being updated and luminance compensation by the updated look-up table, respectively.
Figure 7B:
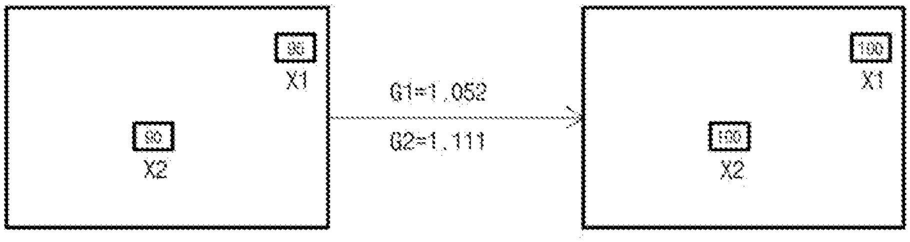

FIGS. 7A and 7B are views conceptually illustrating luminance compensation by the look-up table LUT1 before being updated and luminance compensation by the updated look-up table LUT2, respectively.

As shown in FIG. 6, the look-up tables LUT1 and LUT2 are composed of straight lines in the form of a linear function (for example, first order function). In this case, the straight line of the updated look-up table LUT2 has a greater slope than the straight line of the previous look-up table LUT1. The reason is that the current organic light emitting display device 100 is used in a harsh environment or deterioration is accumulated for a long period of time so that more compensation is required compared to the first look-up table LUT1 prepared in the manufacturing factory when the organic light emitting display device 100 is manufactured.

As a result of sensing the sensing voltage Vsen, deterioration occurs in the first region X1 and the second region X2. In the look-up table LUT1 before the update, the gain value in the first region x1 is 1.032 and the gain value in the second region X2 is 1.066. On the other hand, in the updated look-up table LUT2, the gain value of the first region X1 is 1.052 and the gain value of the second region X2 is 1.111.

As shown in FIG. 7A, when the luminance of the non-deteriorated region is 100% and the luminance of the first region X1 and the second region X2 which are deteriorated are 95% and 90%, respectively, the gain values of the first region X1 and the second region X2 are G1=1.032 and G2=1.066, respectively. When the first region X1 and the second region X2 are compensated by these gain values G1 and G2, the luminance of the first region X1 is approximately 98% (95%×1.032=98.04%) and the luminance of the second region X2 is approximately 96% (90%×1.066=95.94%).

Accordingly, even if the luminance is compensated for by the previous look-up table LUT1, the luminance of the deteriorated region does not become 100%, but becomes the lower luminance, and thus complete compensation is not achieved.

On the other hand, as shown in FIG. 7B, when the luminance of the first region X1 and the second region X2 which are deteriorated is 95% and 90%, respectively, the first region X1 and the second region X2 has the gain value of G1=1.052 and G2=1.111. When the first region X1 and the second region X2 are compensated by these gain values G1 and G2, the luminance of the first region (X1) and the second region (X2) becomes about 100% (X1=95%×1.052=99.94%, X2=90%×1.111=99.99%).

As described above, the compensation for deterioration by the look-up table LUT1 before updated does not increase the luminance of the corresponding region by 100%, whereas the compensation for deterioration by the updated lookup table LUT2 increases the luminance of the corresponding region by about 100%. Therefore, by taking the image displayed on the current display panel PAN, measuring the luminance, and updating the lookup table LUT1 as the new lookup table LUT2, the efficiency of compensation for deterioration of the deteriorated region of the organic light emitting display device 1 can be greatly improved.

Figure 8:
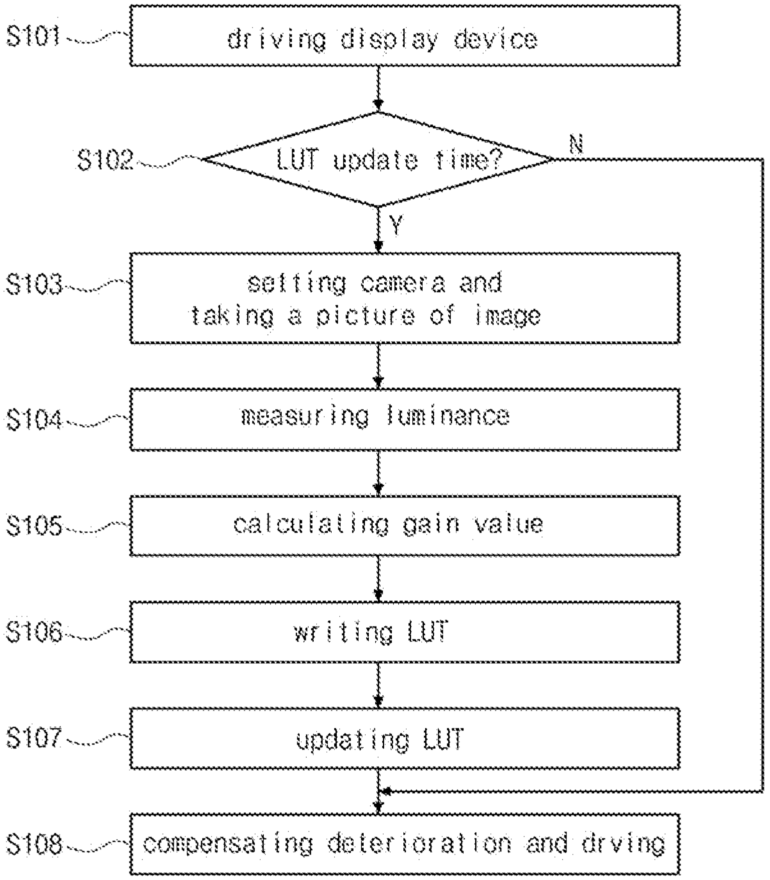
FIG. 8 is a flowchart showing a method of driving the organic light emitting display device according to an embodiment of this disclosure.

FIG. 8 is a flowchart showing a method of driving the organic light emitting display device in which the deterioration is compensated according to an embodiment of this disclosure. The driving method of the organic light emitting display device 1 will be described in detail accompanying this figure.

As shown in FIG. 8, first the organic light emitting display device 1 is driven to display the image on the display panel PAN (S101).

Thereafter, it is determined whether it is an update time of the look-up table LUT (S102). If it is not the update time, the display panel PAN is driven by compensating for deterioration by the look-up table LUT1 before update (S108).

At this time, the update time of the look-up table LUT can correspond to the driving number or driving time of the organic light emitting display device 1. Further, the update time of the look-up table LUT can be the checking time or repair time of the apparatus having the organic light emitting display device such as the automobile or the mobile phone.

When the organic light emitting display device 1 is at the update time of the look-up table LUT (S102), the camera is set on the front side of the display panel PAN to take a picture of an image displayed on the display panel PAN to input the taken image picture to the luminance measuring unit 157 of the look-up table updating unit 152 (S103).

Figure 9:
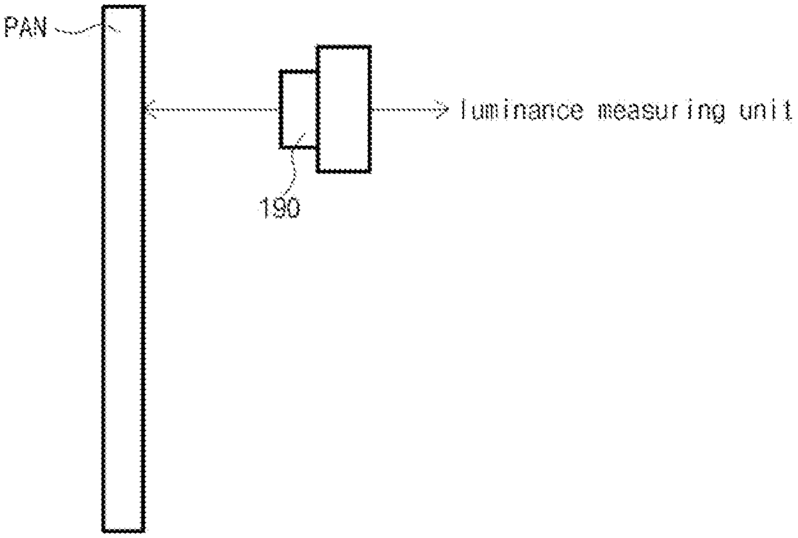
FIG. 9 is a diagram illustrating an image of the display panel captured by the camera according to an embodiment of this disclosure.

FIG. 9 is a diagram illustrating an image of the display panel PAN captured by the camera 190.

As shown in FIG. 9, the camera 190 is disposed in front of the display panel PAN on which the image is displayed. The camera 190 can be mounted on a transport means to take a picture of the screen while moving along the short side direction or the long side direction of the display panel PAN from the front side of the display panel PAN. Further, the camera 190 can move along the front and rear directions of the display panel PAN. The position of the deteriorated region is inputted in the camera 190 so that the camera 190 can be moved to the corresponding position by the transport means.

The camera 190 can use a CCD (Charge Coupled Device) camera, but is not limited thereto.

Figure 10:
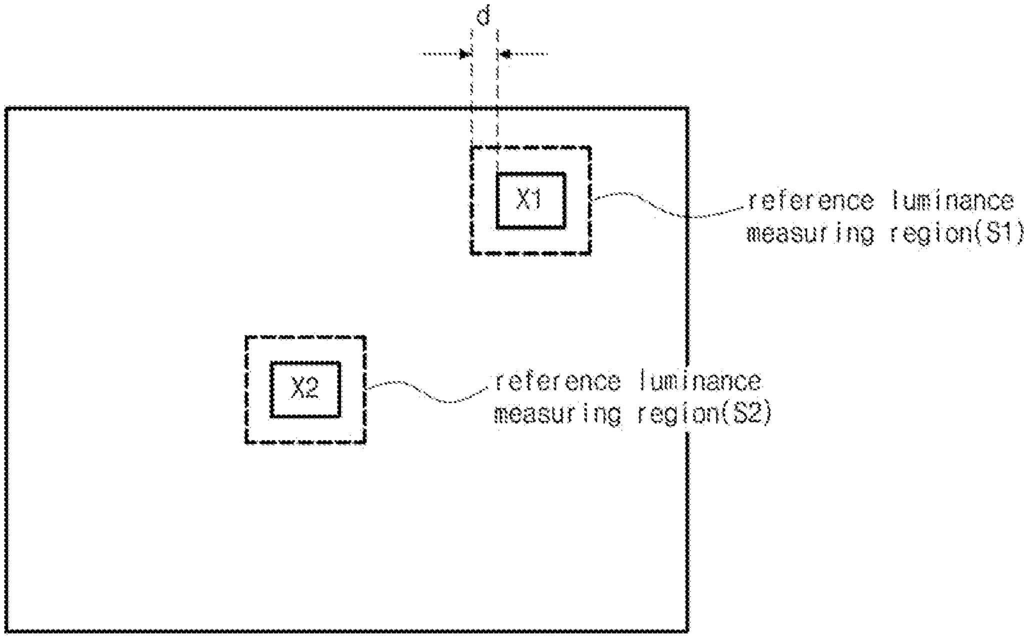
FIG. 10 is a diagram illustrating the measurement of luminance in the deteriorated region and the reference luminance measuring region by the camera.

As shown in FIG. 10, the camera 190 takes picture of the deteriorated regions X1 and X2 as well as the reference luminance measuring regions S1 and S2. The reference luminance measuring regions S1 and S2 are regions that are not deteriorated. The camera 190 measures the luminances of images of the deteriorated regions X1 and X2 and the reference luminance measuring regions S1 and S2, and the gain value is calculated in the look-up table updating unit 152 based on the luminance of the deteriorated regions X1 and X2 and the luminance of the reference luminance measuring regions S1 and S2.

Specially, according to an example of the present disclosure, the periphery of the deteriorated regions X1 and X2 is set as the reference luminance measuring regions S1 and S2, and thus the gain value is calculated based on the luminance of the deteriorated regions X1 and X2 and the luminance (i.e., reference luminance) of the peripheral reference luminance measuring regions S1 and S2.

Therefore, when calculating the gain values of the plurality of deteriorated regions X1 and X2, the luminance of the deteriorated regions X1 and X2 and the luminance of the corresponding reference luminance measuring regions S1 and S2 are measured, and the corresponding deterioration occurrence regions are respectively measured to calculate the gain values of each of the deteriorated regions X1 and X2. For example, the gain value G1 of the first deteriorated region X1 is calculated by the luminance of the first deteriorated region X1 and the luminance of the first reference luminance measuring region S1, and the gain value G2 of the second deteriorated region X2 is calculated by the luminance of the second deteriorated region X2 and the luminance of the second reference luminance measuring region S2.

In this case, the distance d between the deteriorated regions X1 and X2 and reference luminance measuring regions S1 and S2 is about equal to the sum of the widths of 15-20 sub pixels. However, this distance is not limited this, and can be various set.

As described above, according to an example of the present disclosure, the reference luminance measuring regions S1 and S2 are set as the peripheral regions of the deteriorated regions X1 and X2, respectively, for the following reasons.

The deterioration of the organic light emitting layer may occur over the entire screen of all display panels PAN, but can mainly occur only in a certain area. In particular, deterioration of the organic light emitting layer occurs a lot in the region where an image with a constant luminance is displayed for long time. For example, a lot of deterioration occurs in the region where the same character or figure is displayed for long time.

The deteriorated regions X1 and X2 include a plurality of sub pixels, and the sub pixels of the deteriorated regions X1 and X2 may not all have the same luminance but can have different luminances. In addition, the luminance around the deteriorated regions X1, X2 is also affected by the deteriorated regions X1, X2.

For example, in the case of displaying an image having a specific shape, the luminance must be sequentially changed from the boundary of the region in which the image is displayed to the certain region in order to smoothly express the image. In addition, since the current of the same magnitude is supplied to the region where the same character or figure is displayed for long time, not only the corresponding region but also adjacent regions can be affected by the long lime supply of the same current.

Although the adjacent regions affected by these deteriorated regions X1 and X2 are not sensed as deteriorated, their luminance is slightly decreased compared to other region (for example, regions not affected by the deteriorated regions X1, X2).

Therefore, if other region than the peripheral region of the deteriorated regions X1 and X2 is set as the reference luminance measuring region to calculate the gain value, even when the deteriorated regions X1 and X2 are compensated by the calculated gain value, the luminance difference occurs between the deterioration-compensated deterioration region X1, X2 and the peripheral region thereof. In other words, the difference in luminance occurs between the deteriorated regions X1 and X2 for which deterioration is compensated and the region in which the luminance is slightly decreased due to the effect of deterioration.

Although such the luminance difference is very small, since the luminance changes abruptly at the boundary of the deteriorated regions X1 and X2, the user's eyes clearly recognize the small luminance difference.

According to an example of the present disclosure, since the peripheral regions of the deteriorated regions X1 and X2 is set as the reference luminance measuring regions S1 and S2, there is no luminance difference between the deteriorated regions X1 and X2 in which the deterioration is compensated and the reference luminance measuring regions S1 and S2.

In particular, in this disclosure, since the distance d between the deteriorated regions X1 and X2 and the reference luminance measuring regions S1 and S2 is equal to the sum of the widths of 15-20 sub-pixels, there is no luminance difference between the deteriorated regions X1 and X2 in which the deterioration is compensated and the peripheral region of the deteriorated regions X1 and X2. Also, there is no luminance difference between the deteriorated regions X1 and X2 in which the deterioration is compensated and other region which is not deteriorated.

If the distance d between the deteriorated regions X1 and X2 and the reference luminance measuring regions S1 and S2 is smaller than the sum of the widths of 15-20 sub-pixels, the luminance of the reference luminance measuring regions S1 and S2 is much decreased than the luminance of other region which is not deteriorated (i.e., 100% luminance). Thus, in case where the deteriorated regions X1 and X2 are compensated by the gain value calculated based on the luminance this reference luminance measuring regions S1 and S2, the user recognizes the difference in luminance between the deteriorated regions X1 in which the deterioration is compensated and X2 and the non-deterioration region.

If the distance d between the deteriorated regions X1 and X2 and the reference luminance measuring regions S1 and S2 is larger than the sum of the widths of 15-20 sub-pixels, the user recognizes the difference in luminance between the deteriorated regions X1 in which the deterioration is compensated and X2 and the peripheral regions of the deteriorated regions X1 and X2.

Each of the reference luminance measuring regions S1 and S2 can be photographed a plurality of times. Since the luminance around the deteriorated regions X1 and X2 has a slight difference depending on the position, a spot can occur at the boundary due to the luminance difference depending on the position when the deterioration is compensated.

According to an example of the present disclosure, by photographing a plurality of positions of each of the reference luminance measuring regions S1 and S2 and determining the average value of the luminance of the plurality of photographed positions as the reference luminance, it is possible to minimize the difference in luminance depending on the position. For example, in this invention, 8 points of each of the reference luminance measuring regions S1 and S2 can be photographed and the average luminance value thereof can be determined as the reference luminance. However, this invention is not limited thereto, and the average luminance value can be determined as the reference luminance by photographing the positions of 7 points or less or 9 or more points.

Referring back to FIG. 8, the luminance measuring unit 157 of the look-up table updating unit 152 analyzes the captured image input from the camera 190 to measure the luminance of the corresponding regions (S104), and the gain value calculating unit 158 calculates the gain value based on the measured luminance (S105).

Figure 11:
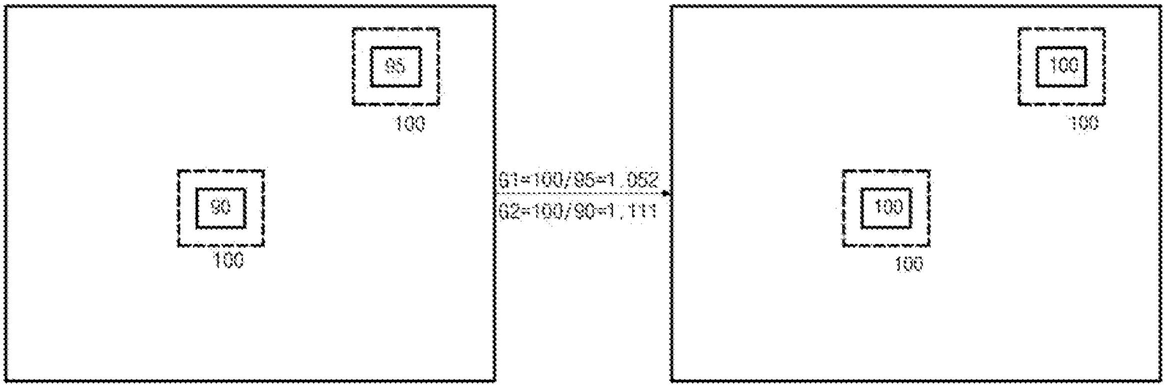
FIG. 11 is a view showing calculating a gain value from the luminance of the deteriorated regions and the luminance of the reference luminance measuring regions.

FIG. 11 is a view showing calculating gain value from the luminance of the deteriorated regions X1 and X2 and the luminance of the reference luminance measuring regions S1 and S2.

As shown in FIG. 11, the measured luminance of the first deterioration region X1 is 95% and the measured luminance of the first reference luminance measuring region S1 is 100%. Therefore, in order to increase the luminance (95%) of the first deterioration region X1 to the luminance (100%) of the first reference luminance measuring region S1, the gain value G1 should be set to G1=100/95=1.052.

Further, the measured luminance of the second deterioration region X2 is 90% and the measured luminance of the second reference luminance measuring region S2 is 100%. Therefore, in order to increase the luminance (90%) of the second deterioration region X2 to the luminance (100%) of the second reference luminance measuring region S2, the gain value G2 should be set to G2=100/90=1.111.

Referring back to FIG. 8, after the gain value is calculated and a new look-up table LUT is written (S106), the look-up table LUT stored in the memory 160 is updated by the new look-up table LUT (S107).

Figure 12:
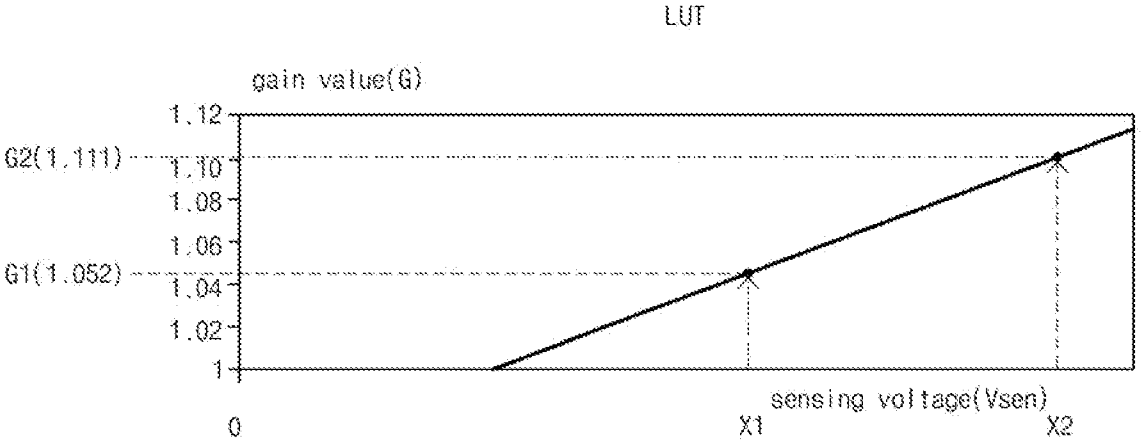
FIG. 12 is a view showing the look-up table newly written and updated in the organic light emitting display device according to an embodiment of this disclosure.

FIG. 12 is a view showing the look-up table LUT newly written and updated in the organic light emitting display device 1 according to an example of this disclosure.

As shown in FIG. 12, the function for sensing voltage Vsen measured in the deteriorated region versus the gain value corresponding to the sensing voltage Vsen can be written as the look-up table LUT. In this case, x-axis (horizontal axis) is the sensing voltage Vsen and y-axis (vertical axis) is the gain value.

At this time, since the gain value G1 for the sensing voltage Vsen measured in the first deteriorated region X1 is 1.052 and the gain value G2 for the sensing voltage Vsen measured in the second deteriorated region X2 is 1.111, the look-up table (LUT) in the linear form of the first order function can be written by connecting these coordinates.

Further, according to an example of the present disclosure, the look-up table LUT can be formed by measuring the luminance of three or more deteriorated regions and the reference luminance measuring region of the peripheral region thereof to calculate three or more gain values. In this case, the look-up table LUT can be in the form of the linear function connecting the coordinates of the gain values G with respect to three or more sensing voltages Vsen, or in the curve form of secondary order function.

Referring again to FIG. 8, the organic light emitting display device 1 is driven by compensating the deterioration by the updated look-up table LUT (S108). For example, after the gain value reading unit 154 of the deterioration compensating unit 150 reads the gain value of the look-up table LUT stored in the memory, the data modulating unit 156 modulates the image data Idata by the gain value to supply the modulated image data Mdata to the display panel PAN in order to display image.

As described above, according to an example of the present disclosure, the image displayed on the organic light emitting display device 1 is directly photographed at the update time or the necessary time to measure the luminance of the image and then to update the look-up table for compensating the deterioration of the organic light emitting display device. Accordingly, even when the organic light emitting display device 1 is used in the harsh environment or when deterioration is accumulated for long time, it is possible to accurately compensate for deterioration.

Features, structures, effects, etc. described in the above-described examples of the present application are included in at least one example of the present application, and are not necessarily limited to only one example. Furthermore, features, structures, effects, etc. illustrated in at least one example of the present application can be combined or modified with respect to other examples by those of ordinary skill in the art to which the present application pertains. Accordingly, the contents related to such combinations and modifications should be interpreted as being included in the scope of the present application.

The present application described above is not limited to the above-described embodiments and the accompanying drawings, and it is common in the technical field to which this application pertains that various substitutions, modifications, and changes are possible without departing from the technical matters of the present application. It will be clear to those who have the knowledge of Therefore, the scope of the present application is indicated by the following claims, and all changes or modifications derived from the meaning and scope of the claims and their equivalent concepts should be construed as being included in the scope of the present application.

What is claimed is:

1. A display device comprising:

a display panel including a plurality of sub pixels to display an image;

a memory configured to store a look-up table including a gain value; and a deterioration compensating unit configured to compensate a deterioration of a deteriorated sub pixel based on a sensing voltage input from the display panel, and update the look-up table by measuring a luminance of the image displayed on the display panel, wherein the deterioration compensating unit updates the look-up table by capturing directly a first camera picture of images displayed in a deterioration region where sub pixels among the plurality of sub pixels are deteriorated and a second camera picture of a reference luminance measuring region where other sub pixels among the plurality of sub pixels are not deteriorated to obtain a first measured luminance of the deterioration region and a second measured luminance of the reference luminance measuring region, and then comparing the first measured luminance of the first camera picture of the deterioration region and the second measured luminance of the second camera picture of the reference luminance measuring region, wherein a position of the deterioration region for determining where to take the first camera picture is determined by measuring the sensing voltage of the corresponding area from the display panel, and wherein the reference luminance measuring region for taking the second camera picture is positioned around the deterioration region, and wherein the sub pixels in the deterioration region are directly compensated based on a difference between the first measured luminance of the first camera picture of the deterioration region and the second measured luminance of the second camera picture of the reference luminance measuring region.

2. The display device of claim 1, wherein the distance between the reference luminance measuring region and the deterioration region is equal to a sum of the widths of 15 to 20 sub pixels.

3. The display device of claim 1, wherein the luminance at a boundary between the deterioration region where the luminance is compensated and another region where the sub pixels are not deteriorated is not abruptly changed.

4. The display device of claim 1, wherein the gain value calculating unit calculates the gain value based on the first measured luminance of the deteriorated region of the display panel and the second measured luminance of the reference luminance measuring region.

5. The display device of claim 4, wherein the second measured luminance of the reference luminance measuring region is an average value luminance of a plurality of positions of the reference luminance measuring region.

6. The display device of claim 1, wherein the deterioration compensating unit includes:

a look-up table updating unit configured to write a new look-up table by measuring the luminance of the image displayed in the display panel to update the look-up table stored in the memory;

a gain value reading unit configured to read a gain value of the look-up table stored in the memory; and a data modulating unit configured to modulate data input to the display panel based on the gain value from the gain value reading unit.

7. The display device of claim 6, wherein the look-up table updating unit updates the look-up table according to a request.

8. The display device of claim 6, wherein the look-up table updating unit updates the look-up table at the predetermined update timing.

9. The display device of claim 8, wherein the update timing is stored in the memory.

10. The display device of claim 6, wherein the look-up table updating unit includes:

a luminance measuring unit configured to measure the luminance of the image displayed on the display panel;

a gain value calculator configured to calculate the gain value based on the luminance measured in the luminance measuring unit; and a look-up table writing unit configured to write the new look-up table based on the gain value calculated in the gain value calculating unit.

11. The display device of claim 10, wherein the look-up table writing unit writes the new look-up table by calculating the gain values of a plurality of deterioration regions.

12. The display device of claim 10, wherein the luminance of the image displayed on the display panel is measured by a camera.

13. The display device of claim 12, wherein the camera includes a charged coupled device camera.

14. A method of compensating deterioration of a display device, the method comprising:

determining a position of a deterioration region by measuring a sensing voltage of the corresponding area for determining where to take a first camera picture;

capturing directly the first camera picture of images displayed on the deterioration region of a display panel of the display device where sub pixels among the plurality of sub pixels are deteriorated and a second camera picture of a reference luminance measuring region of the display panel that is a peripheral region of the deteriorated region where other sub pixels among the plurality of sub pixels are not deteriorated to obtain a first measured luminance of the deterioration region and a second measured luminance of the reference luminance measuring region;

comparing the first measured luminance of the first camera picture of the deterioration region and the second measured luminance of the second camera picture of the reference luminance measuring region to determine a difference in luminance;

calculating a gain value based on the difference in luminance;

writing a look-up table based on the calculated gain value and updating a previous look-up table with the written look-up table;

modulating data according to the updated look-up table; and applying the modulated data to the display panel to compensate the luminance in the deterioration region, wherein the reference luminance measuring region is positioned around the deterioration region, and wherein the sub pixels in the deterioration region are directly compensated in accordance with the luminance of the reference luminance measuring region.

15. The method of claim 14, wherein the updating the look-up table includes updating the previous look-up table based on the gain values of a plurality of deteriorated regions.

16. The method of claim 14, wherein the measuring the luminance includes taking a picture of the image by a camera.

17. The method of claim 16, wherein the camera measures the luminance of the deteriorated region of the display panel and the luminance of the reference luminance measuring region around the deteriorated region.

18. The method of claim 17, wherein the calculating the gain value includes calculating the gain value based on the first measured luminance of the deteriorated region and the second measured luminance of the reference luminance measuring region.

* * * * *